United States Patent
Lubic et al.

(10) Patent No.: US 10,390,520 B2
(45) Date of Patent: Aug. 27, 2019

(54) BIRD FEEDER CABLE LID LOCK AND BIRD FEEDER WITH THE SAME

(71) Applicant: WOODSTREAM CORPORATION, Lititz, PA (US)

(72) Inventors: Marko K. Lubic, Shillington, PA (US); Andrew Ryan Hoffman, Lititz, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 193 days.

(21) Appl. No.: 15/674,820

(22) Filed: Aug. 11, 2017

(65) Prior Publication Data

US 2018/0206457 A1    Jul. 26, 2018

Related U.S. Application Data

(60) Provisional application No. 62/449,797, filed on Jan. 24, 2017.

(51) Int. Cl.
*A01K 39/00* (2006.01)
*A01K 39/01* (2006.01)
*A01K 39/012* (2006.01)

(52) U.S. Cl.
CPC ........ *A01K 39/0113* (2013.01); *A01K 39/012* (2013.01)

(58) Field of Classification Search
CPC .. A01K 39/00; A01K 39/0113; A01K 39/012; A01K 61/02
USPC ...... 119/51.01–51.04, 52.1–52.4, 53.5, 57.8, 119/57.9, 428, 429, 459; D30/124–128
See application file for complete search history.

(56) References Cited

U.S. PATENT DOCUMENTS

| | | | | |
|---|---|---|---|---|
| 2,362,215 A | * | 11/1944 | Morreale | A01K 39/06 119/51.01 |
| 3,977,363 A | * | 8/1976 | Fisher, Jr. | A01K 39/0113 119/52.3 |
| 4,030,451 A | | 6/1977 | Miller | |
| 6,679,196 B1 | * | 1/2004 | Whittles | A01K 39/0113 119/51.01 |
| 9,433,193 B2 | | 9/2016 | Hoysak | |
| 2006/0272585 A1 | * | 12/2006 | O'Dell | A01K 39/012 119/57.8 |
| 2010/0258054 A1 | * | 10/2010 | Frazier | A01K 39/012 119/52.2 |
| 2012/0037080 A1 | | 2/2012 | Hepp et al. | |

(Continued)

*Primary Examiner* — Richard T Price, Jr.
(74) *Attorney, Agent, or Firm* — Jacobson Holman, PLLC.

(57) ABSTRACT

A bird feeder cable lid lock is provided for a bird feeder having a feed reservoir body with a removable lid having an aperture therein, and a wire or cable threaded through the aperture by which the feeder is suspended in use. The cable lid lock includes a threaded bolt having an axial hole through which the hanging cable is fed and an internally threaded base element in abutment with the lid and having a stepped or tapered bore with a diminishing diameter that receives the bolt. The bolt has a relief cut in the shank to form at least two arms on different sides of the cable. The arms are pressed toward one another as the bolt is tightened into the diminishing diameter base element bore, squeezing the cable where it extends through the bolt and exerting a significant force normal to the cable that, with the coefficient of friction, creates a very effective locking action on the cable to secure the lid against the feed reservoir body.

17 Claims, 9 Drawing Sheets

(56) References Cited

U.S. PATENT DOCUMENTS

| | | | |
|---|---|---|---|
| 2013/0255581 A1* | 10/2013 | Donegan | A01K 39/012 |
| | | | 119/57.8 |
| 2014/0311413 A1 | 10/2014 | Hoysak | |
| 2016/0113247 A1* | 4/2016 | McCord | A01K 39/0113 |
| | | | 119/52.3 |
| 2016/0128307 A1* | 5/2016 | Cote | A01K 39/012 |
| | | | 119/52.2 |

* cited by examiner

BIRD FEEDER CABLE LID LOCK AND BIRD FEEDER WITH THE SAME

This application claims the priority of U.S. Provisional Application Serial No. 62/449,797 filed Jan. 24, 2017.

BACKGROUND OF THE INVENTION

Field of the Invention

The present invention is related to the field of wild bird care and feeding and, more particularly, to an improved bird feeder cable lid locking mechanism and a bird feeder with the same.

Description of the Related Art

Feeding wild birds is a popular activity for many people. Bird feeders are typically filled with seed through an opening in the top of the seed reservoir. Once filled, the opening is closed by a feeder lid to both protect the seed from precipitation and to prevent inadvertent spillage. In addition, the lid must be securely held in place to prevent squirrels and other unwanted visitors to the feeder from gaining unrestricted access to the seed in the reservoir. Various lid locking mechanisms exist for this purpose, many of which are designed to close the top of the reservoir while also accommodating a hanging cable or wire that is connected to the feeder and used to suspend the feeder from a support, such as a tree limb or free-standing pole, during use.

One such bird feeder lid locking mechanism is a spring-biased cable clamp, referred to herein as the "sure lock cable clamp" or the "sure lock". The sure lock cable clamp includes an outer sleeve, a spring and an inner plunger that acts on the hanging wire perpendicular to the axis of the wire. To adjust the position of the sure lock on the wire, the plunger is pushed in by the user, compressing the spring to align an opening in the sure lock with the wire and allow the sure lock to slide on the wire to a desired position. When released, the plunger is pushed out of the sleeve by the spring, creating a normal force that pinches the wire between the outer housing and the inner plunger and prevents the sure lock from sliding up and down the wire.

The force with which the sure lock cable clamp secures the lid by remaining in a fixed location on the wire is limited by the force of the spring and the coefficient of friction of the material of which the sure lock cable clamp is made, as well as any coating on the wire. When the wire is nylon coated, a plastic sure lock cable clamp has limited grip due to the low relative friction between the materials.

Accordingly, a need exists for a cable lid lock that is stronger and more effective in resisting the efforts made by squirrels, raccoons and the like, to remove the lid from a bird feeder and access the seed in the feeder reservoir and for a bird feeder having such a cable lid lock.

SUMMARY OF THE INVENTION

In view of the foregoing, the present invention is directed to a bird feeder and a bird feeder cable lid lock therefor. The bird feeder includes a feed reservoir body with a removable lid having an aperture therein, and a wire or cable threaded through the aperture by which the feeder is suspended in use. The lower end of the cable is secured to the reservoir body at an attachment point, such as on the bottom of the reservoir or on a framing member below the removable lid, from which point the cable extends upwardly, passing through the aperture in the lid, to an upper end used to hang the feeder.

The cable lid lock includes a threaded bolt, a base element and an insert element preferably embodied as an internally threaded nut or fastener. The bolt has an axial hole through which the hanging cable is fed, a longitudinally extending slice or relief cut in the shank and a tapered tip having at least two sides or arms formed by the relief cut in the shank. The base element has an upper surface and a lower surface with a bore extending therebetween. In a preferred embodiment, the bore has an upper part with a first bore diameter, a middle part with a second bore diameter smaller than the first bore diameter and a lower part with a third bore diameter smaller than the second bore diameter, creating a stepped bore. The third bore diameter is slightly larger than the outer diameter of the hanging cable of the feeder to allow for free sliding passage of the cable in the lower part of the bore.

The insert element has an outer diameter sized to enable the insert element to be snugly received in the upper part of the base element bore, either by a press fit or more preferably by a screwed-in engagement. The shank of the bolt is threadedly engaged in the insert element with the depth of the upper part of the bore being sufficient to accommodate the threaded shank portion of the bolt while the tapered tip of the bolt extends into the middle part of the bore. The tapered tip is small enough to enter the middle part of the bore but as the bolt is threaded further into the insert element for tightening thereof, the at least two arms of the tapered tip contact the sides of the bore in the middle part and are pushed closer together, squeezing the cable where it extends through the tapered tip of the bolt. When the bolt is fully tightened into the base element, the normal force exerted on the cable by the at least two arms of the tapered tip is very high and, with the coefficient of friction, creates a very effective locking feature by which the cable lid lock is held in place to prevent the lid from being opened.

Accordingly, it is an object of the present invention to provide a bird feeder cable lid lock that exerts a normal force on a hanging wire or cable of a bird feeder that is far greater than the force generated by a spring-biased plunger to securely clamp the lid lock on the cable and thereby lock the lid of a bird feeder onto the feed reservoir body.

Another object of the present invention is to provide a bird feeder cable lid lock in accordance with the preceding object that includes a base element with a bore therethrough, an insert element received in the base element bore, and a bolt received within the insert element, the bolt having an axial hole through which the hanging cable is fed and a threaded shank with a longitudinally extending slice or relief cut therein to create at least two sides or arms that are forced together to grip the hanging cable when the bolt is tightened into the nut.

A further object of the present invention is to provide a bird feeder cable lid lock in accordance with the preceding objects in which the tip of the bolt formed by the plurality of sides or arms is tapered, the bore in the base element being stepped so that the diameter of that part of the bore receiving the tapered tip is smaller than the diameter of that part of the bore receiving the insert element and the threaded shank of the bolt.

Yet a further object of the present invention is to provide a bird feeder with a cable lid lock in accordance with the preceding objects in which the hanging cable extends from a fixed location inside the feeder reservoir through an aperture in the bird feeder lid, the hanging cable being fed through the bore in the base element of the lid lock with the base element being fixed to the lid of the bird feeder.

Another object of the present invention is to provide a bird feeder and cable lid lock in accordance with the preceding objects in which the bolt has a head with a knurled outer edge and a decorative element, such as a decorative bird or the like, to help the consumer grip and twist the bolt when loosening and tightening the lid lock to open and close the feeder lid.

Still another object of the present invention is to provide a bird feeder and cable lid lock in accordance with the preceding objects that is simple and cost effective to manufacture, reliable in operation, and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiments shown herein are given by way of illustration only. It is not intended that the invention be limited in its scope to the details of construction and arrangement of components set forth in the following description or illustrated in the drawings. Also, in describing the preferred embodiment and alternate structure, specific terminology will be resorted to for the sake of clarity. It is to be understood that each specific term includes all technical equivalents which operate in a similar manner to accomplish a similar purpose.

Figure 1:
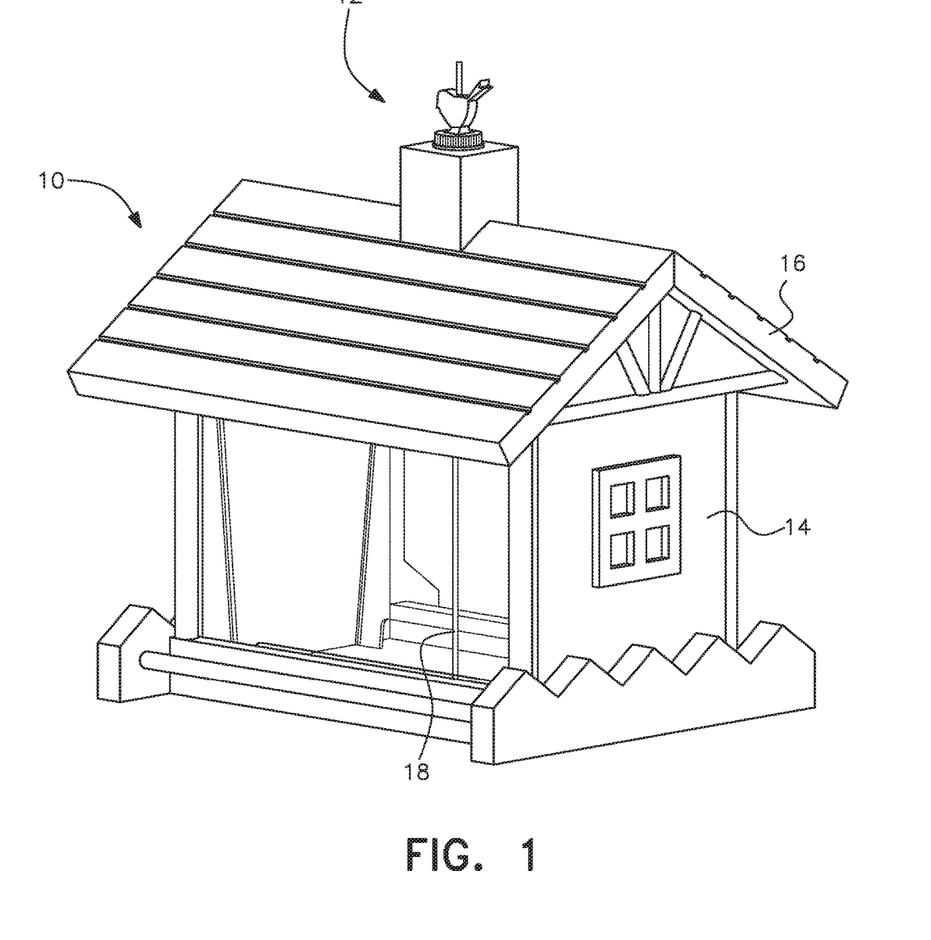
FIG. 1 is a side perspective view of a bird feeder with a cable lid lock in accordance with a preferred embodiment of the present invention.
Figure 2:
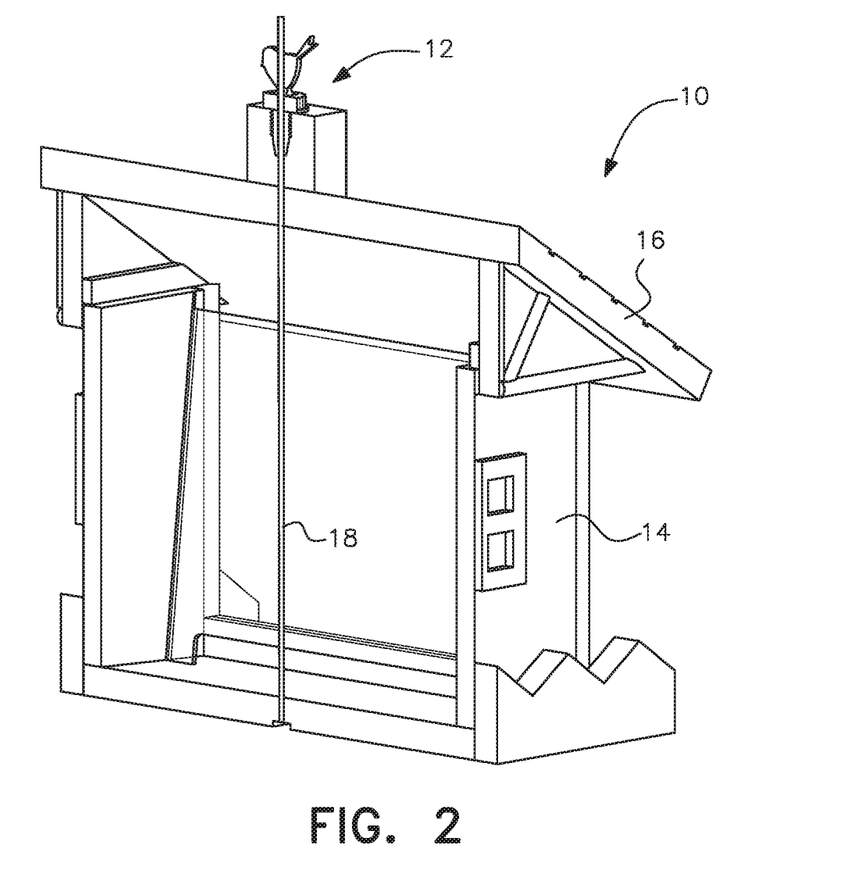
FIG. 2 is a cutaway view of the bird feeder and cable lid lock shown in FIG. 1.

As shown in FIGS. 1 and 2, the present invention is directed to a hanging style bird feeder generally designated by reference numeral 10 having a cable lid lock generally designated by reference numeral 12. The bird feeder 10 includes a reservoir body 14, a removable lid 16 and a hanging wire or cable 18 for suspending the bird feeder in use. In the embodiment shown, the reservoir body is decoratively modeled to look like a house having a pitched roof line although other shapes and designs could also be used in conjunction with the cable lid lock 12 as disclosed herein.

Figure 3:
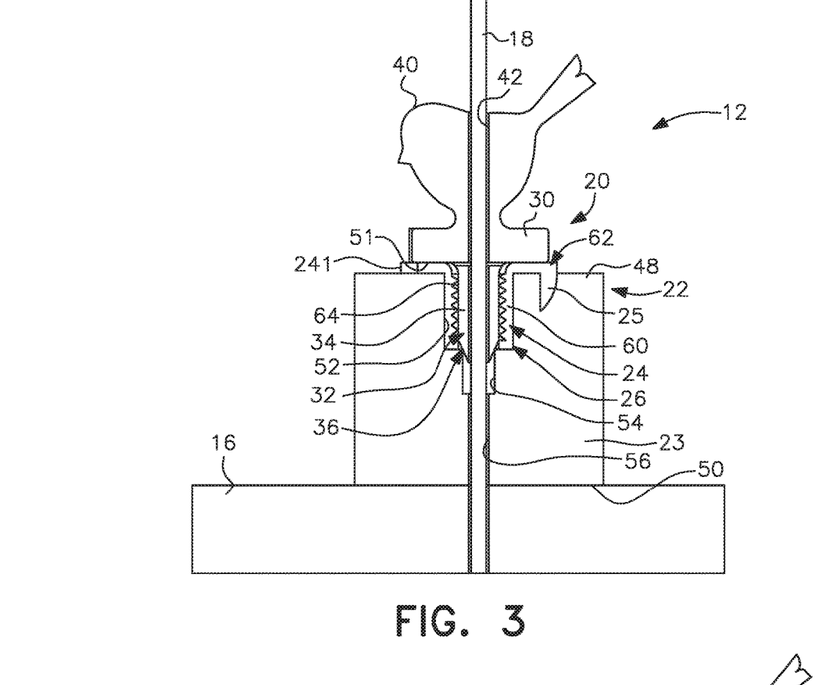
FIG. 3 is an enlarged cross sectional view of a cable lid lock having a base element that includes a base block and a threaded insert element according to the present invention.
Figure 3A:
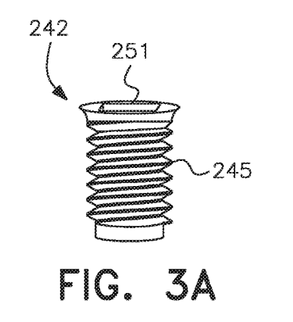
FIG. 3A is a perspective side view of a fastener insert element having engaging elements on its outer surface suitable for use with the present invention.
Figure 3B:
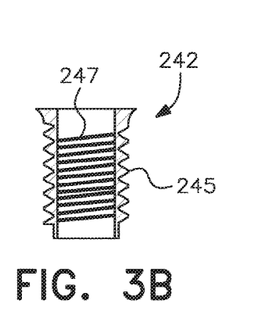
FIG. 3B is a cross-sectional view of the fastener insert element shown in FIG. 3A.
Figure 14:
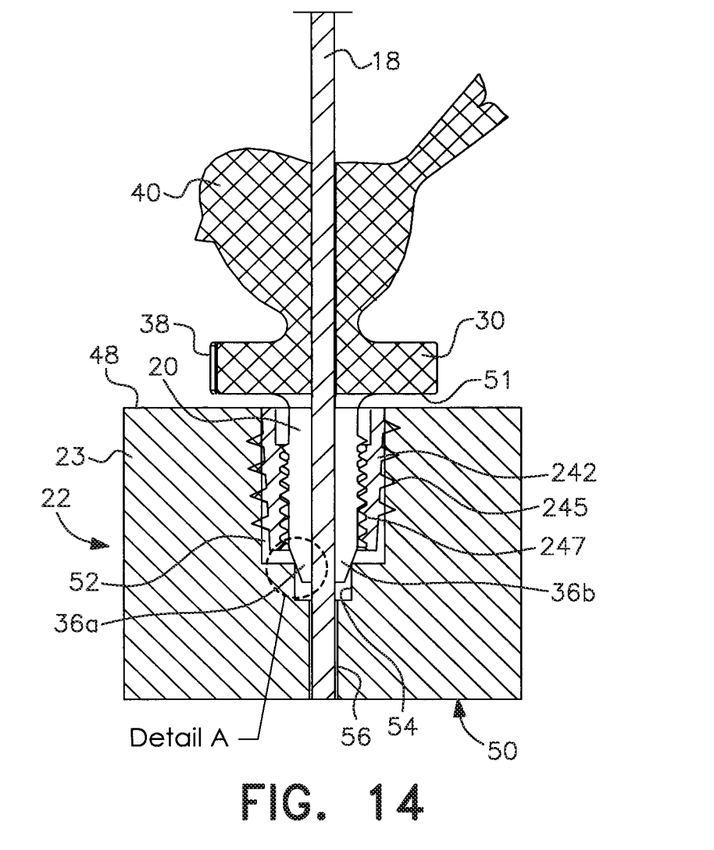
FIG. 14 is a cross sectional view of a base element with a two-stage bore showing the engagement between the tip of the bolt and the bore.

The cable lid lock 12, shown in an enlarged sectional view in FIG. 3, includes a threaded bolt generally designated by reference numeral 20, and an internally threaded base element generally designated by reference numeral 22. Preferably, and as shown in FIGS. 2 and 3, the internally threaded base element 22 includes a base block 23 and an insert element, generally designated by reference numeral 24, that is screwed or pressed into a bore, generally designated by reference numeral 26, formed in the base block 23. The insert element 24 may be embodied as an internally threaded tee nut 241 that is hammered or otherwise pressed into the bore with a friction fit and preferably secured by one or more prongs 25 on the tee nut as is known by persons of skill in the art. More preferably, the insert element 24 is a fastener 242 having an outer surface with engaging elements 245 as shown in FIGS. 3A, 3B and 14 and, as can be seen in the cross sectional views of FIGS. 3B and 14, an internally threaded bore 247. The engaging elements 245 on the outer surface of the fastener 242 are pressed, or preferably screwed, into the softer material of the base block 23 when the fastener is inserted therein as shown in FIG. 14. The engaging elements, which may include threads or other outwardly protruding features, "bite" into the bore of the block 23, securing the fastener and making it resistant to both pull-out and twisting in response to the displacement forces exerted on the fastener when the bolt 20 is threaded into and out of the base element 22. Suitable insert element fasteners of this type are commercially available from E-Z LOK™ of Gardena, Calif. (www.ezlok.com).

Figure 3C:
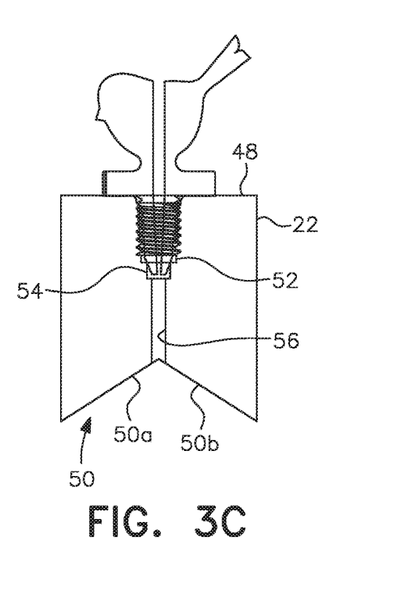
FIG. 3C is a cross sectional view of an alternate configuration of a cable lid lock in which the base element itself is threaded, eliminating the need for an insert element.
Figure 4:
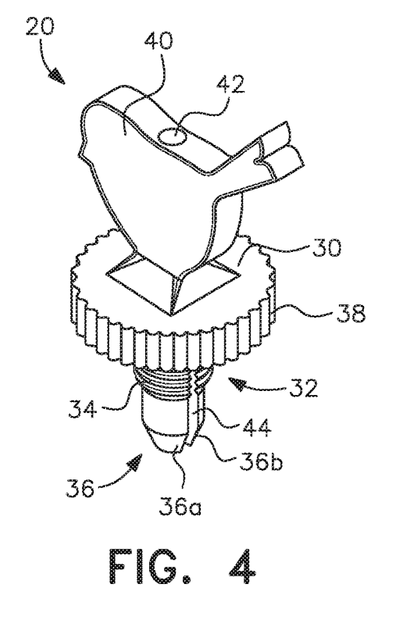
FIG. 4 is a perspective view of the bolt with ornamental top as shown in FIG. 1.
Figure 5:
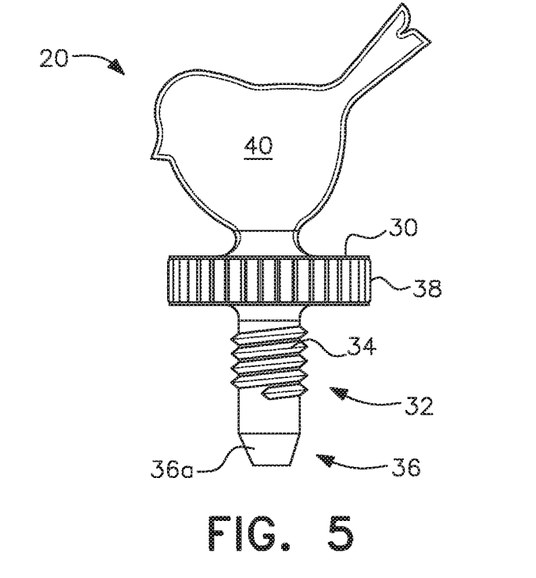
FIG. 5 is a first side view of the bolt shown in FIG. 4 with a profile of the ornamental top.

While insert elements like the tee nut 241 or the fastener 242 in the base block 23 are shown in the embodiments described herein, the base element 22, if made of sufficiently durable material, could be a single component that is itself tapped to have internal threads as shown in FIG. 3C, making a separate insert element unnecessary. However, an insert element such as the fastener 242 is advantageous for its durability and strength in maintaining thread integrity over multiple loosenings and tightenings of the bolt each time the feeder lid is removed for filling and then replaced for use. In the embodiment shown, the insert element 24 is metal, the base block is wood and the bolt is made of plastic. The bolt, insert element and base block could be made of other materials, and may all be made of the same material, as would be understood by persons of ordinary skill in the art.

As shown in various views in FIGS. 4-7, the bolt 20 has a head 30 and a shank generally designated by reference numeral 32. The shank 32 has a threaded part 34 and a tapered tip, generally designated by reference numeral 36. The bolt size is preferably 5/16" with 18 threads per inch but other bolt sizes and thread pitches may be used. The tapered tip 36 has a smaller outer diameter than the diameter of the threaded part 34 of the shank 32. The head 30 preferably has a knurled edge 38 and may optionally be molded or otherwise formed to include an ornamental feature 40 such as the bird shown in FIGS. 1-5, 14 and 15. An axial hole 42 extends longitudinally through the bolt, with the hanging wire or cable 18 of the feeder 10 being passed through the hole 42.

Figure 6:
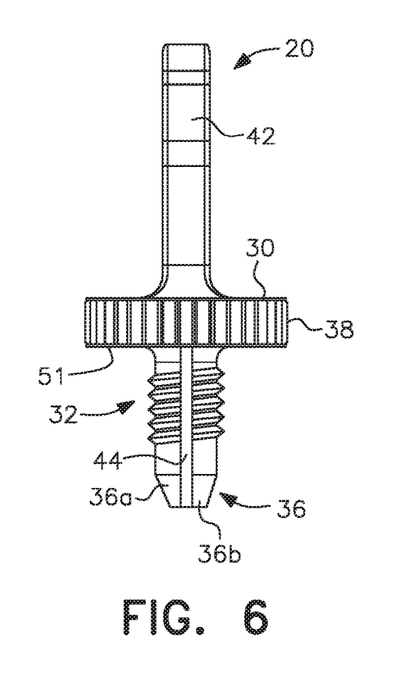
FIG. 6 is a second side view of the bolt shown in FIG. 4 rotated 90° with respect to FIG. 5.
Figure 7:
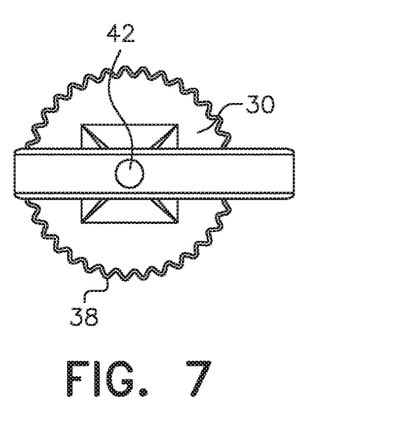
FIG. 7 is a top view of the bolt shown in FIG. 6.
Figure 8:
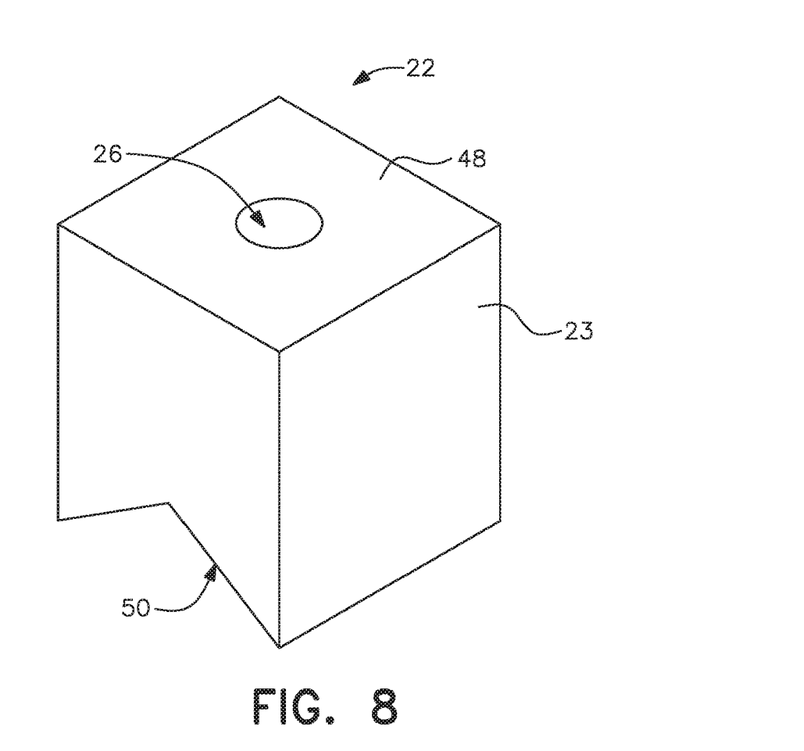
FIG. 8 is a perspective view of the base element of the cable lid lock shown in FIG. 3.
Figure 9:
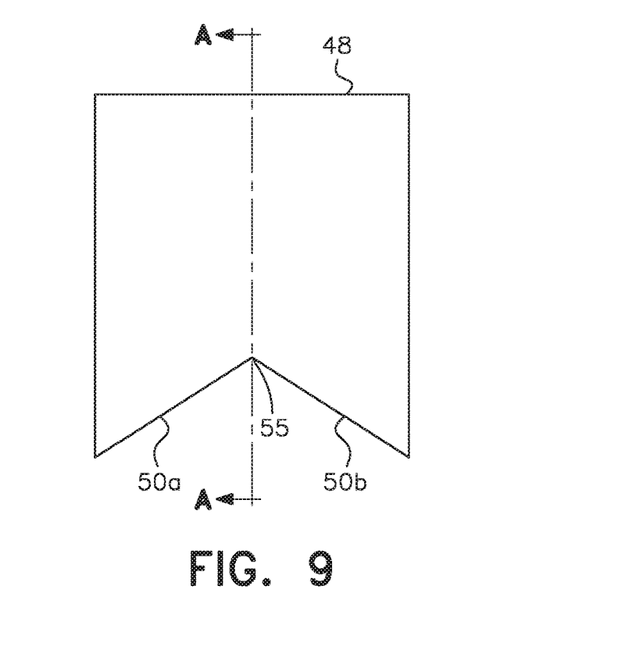
FIG. 9 is a side view of the base element shown in FIG. 8.
Figure 10:
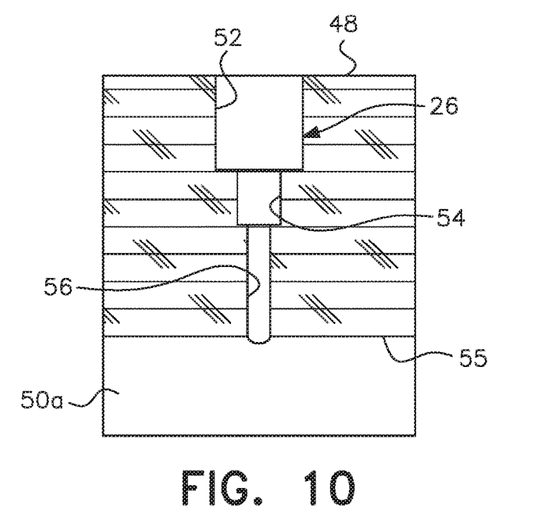
FIG. 10 is a sectional view taken along line A-A of FIG. 9.
Figure 11:
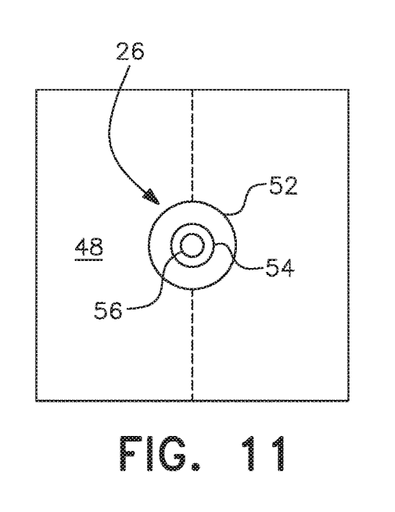
FIG. 11 is a top view of the base element shown in FIG. 9.
Figure 12:
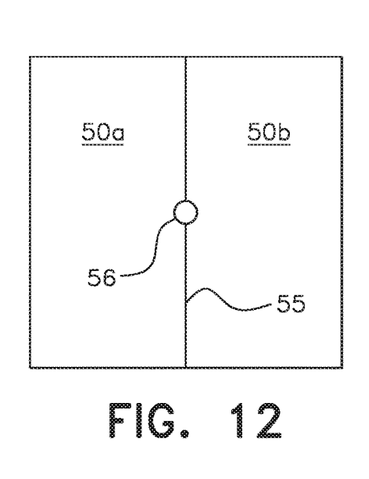
FIG. 12 is a bottom view of the base element shown in FIG. 9.

The shank 32 has a longitudinally extending slice or relief cut 44 that divides the tapered tip 36 into at least two sides 36a and 36b as best seen in FIG. 6. The relief cut 44 enables the at least two sides of the tapered tip 36 of the bolt 20 to be pinched or cinched against the cable when the tip of the bolt is compressed in the bore in the base block 23 as the bolt 20 is tightened in the insert element 24 as will be further described hereinafter. While the two arms or sides 36a, 36b as disclosed herein are shown as being symmetrical, it is also possible to have arms of different sizes by offsetting the relief cut from the center of the shank. The symmetrical sides are preferred, however. Also, while two sides or parts are shown, the shank could be segmented into three, four or even more parts or arms that would then be squeezed together upon engagement with the narrowed bore portion of the base block.

As shown in FIGS. 3, 3C, 8-12 and 14, the base block 23 has an upper surface 48 and a lower surface generally designated by reference numeral 50 with the bore extending 26 therebetween. The bore 26 is drilled into the wooden base block to form an upper part 52 having a first bore diameter, a middle part 54 having a second bore diameter smaller than the first bore diameter, and a lower part 56 having a third bore diameter smaller than the second bore diameter to create a stepped bore (see FIGS. 3, 3C, 10 and 14). Depending on the material, the bore may alternatively be formed by molding, machining and the like. In whatever manner it is made, the third bore diameter is slightly larger than the outer diameter of the hanging cable 18 of the feeder to allow for free sliding passage of the cable in the lower part 56 of the bore 26.

Figure 13A:
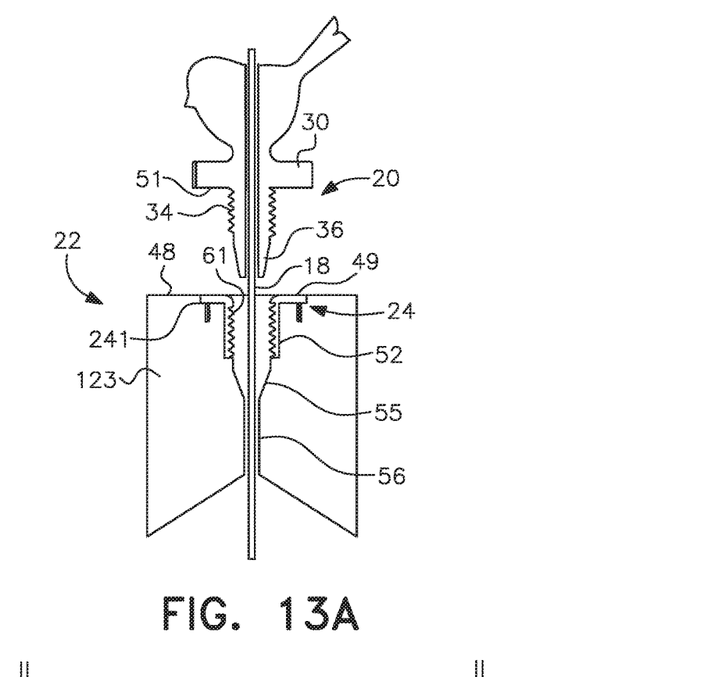
FIGS. 13A-13C show three-stages by which a bolt of a cable lid lock is first separate from, then inserted into and finally locked down within a cable lid lock base block having a tapered middle bore.
Figure 13B:
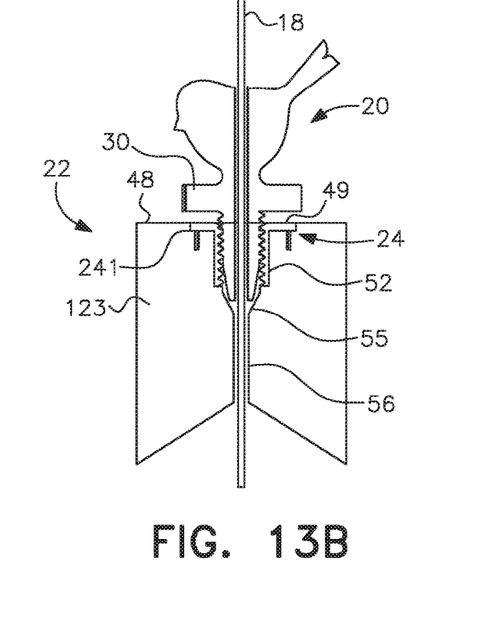
Figure 13C:
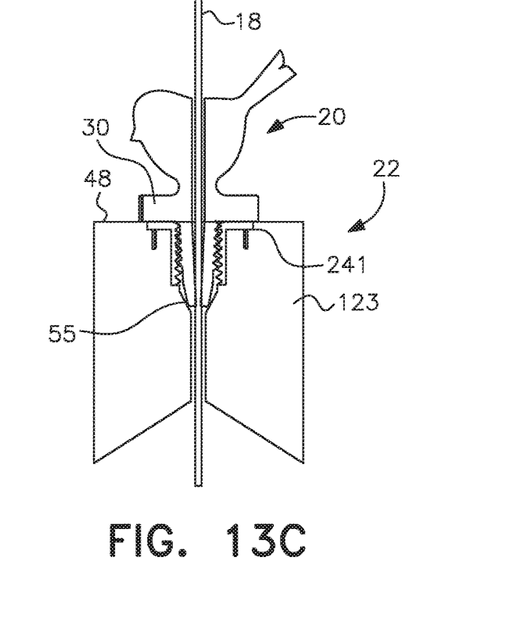

Instead of a stepped bore, the base block may have a bore that tapers from a wider opening at the top to a smaller opening at the bottom or, as shown in FIGS. 13A-13C, the base block 123 may have only a tapered middle part 55. In a configuration having a tapered bore, the taper is preferably 45° or less from vertical. The tapered bore may be formed by drilling, molding, machining and the like. If the bore is tapered, a bolt without a tapered tip could be used since the taper of the bore in the base block would create the desired increase in resistance as the bolt is tightened in the bore, although a tapered tip is preferred.

In the embodiments shown herein, including an internally threaded base element 22 (see FIG. 3C) and a base element having a base block 23, 123 with an insert element 24 (see FIGS. 3, 3A, 3B, 13A-13C and 14), the lower surface 50 of the base block 23 is divided into two sloped sides 50a and 50b extending from and separated by a centerline 55 to create an inverted V-shape, with the bore 26 passing through the centerline 55. The sides 50a, 50b do not have to be equal in size, however. The inverted V-shape of the lower surface 50 enables the base block to fit down in abutment on top of the pitched roof of the lid 16 of the feeder 10 when affixed thereto. Feeders having lids with other shapes may be accommodated through appropriate modification of the topography of the lower surface 50 of the base block 23 to provide a firm interface with the upper surface of the lid to ensure the lid is locked down against the reservoir body when the cable lid lock is tightened. Preferably, the base block 23 is rigidly fixed to the top surface of the lid 16.

As represented by the tee nut 241 shown in FIG. 3, the insert element 24 includes a generally cylindrical neck 60 and a flat head generally designated by reference numeral 62 that is concentric with, and has a larger diameter than, the neck 60. The head 30 of the locking bolt 20 is seated on the flat head 62 of the tee nut 241 when the locking bolt is tightened on the cable 18. An axial central bore, generally designated by reference numeral 64, extends through the head 62 and the neck 60 to accommodate the shank 24 of the bolt 20. The bore 64 in the neck 60 is generally cylindrical and includes internal threads 61 that engage with the external threads 34 on the shank of the bolt 20. The outer diameter of the tee nut 241 is sized to enable the nut to be snugly received in the upper part 52 of the bore 26 in the base block 23, 123 by press fit or the like.

More preferably, the insert element is a fastener 242 having engaging elements on the outer surface as shown in FIGS. 3A, 3B and 14. The fastener 242 preferably has either an internal drive structure 251, such as for an alien wrench, or an external drive structure (not shown), such as a head configured for a socket wrench, that allows the fastener to be screwed into the upper part 52 of the bore for increased resistance to twisting or jacking when the feeder is being used, particularly during lid removal and replacement.

While the depth of the upper part of the bore is sufficient to accommodate the insert element and the threaded shank of the bolt, the tapered tip 36 of the bolt extends into the middle part 54 of the base block bore 26. The end of the tapered tip 36 is small enough to enter the middle part 54 of the bore 26 but as the bolt is threaded further into the insert element 24 for tightening thereof, the two sides 36a, 36b of the tapered tip 36 are brought into contact with the sides of the bore in the middle part 54 and are pushed closer together, squeezing the cable 18 that extends through the axial hole 42 in the bolt.

The process of securing the bolt within the base block to squeeze the cable is illustrated in FIGS. 13A-13C which show a base block 123 having a bore with a tapered middle part 55 and a tee nut 241 inserted in the bore upper part 52. In FIG. 13A, the threaded bolt 20 of the cable lid lock is shown as separated from the base element 22 while remaining in loose sliding engagement with the hanger cable 18 that extends through both the bolt and the base element.

In FIG. 13B, the bolt 20 has been inserted into the tee nut 241 in the bore upper part 52 of the base block 123 so that the threaded part 34 of the bolt shank is engaged within the threads 61 of the tee nut 241. At this level of insertion, the tapered tip 36 has begun to enter the tapered middle part 55 of the base block bore 26 but has not yet come into contact therewith. As also shown, the head 30 of the bolt is still spaced away from the upper surface 48 of the base element at this stage.

FIG. 13C shows the bolt 20 when fully tightened into the base element 22. The threaded engagement of the bolt in the tee nut 241 brings the tapered tip 36 of the bolt into contact with the inner surface of the bore in the tapered middle part 55, squeezing the arms or two sides of the bolt tip together to secure the hanger cable 18 therebetween. As shown in FIGS. 3 and 13C, the lower surface 51 of the bolt head 30 may be flush, or nearly so, with the upper surface 48 of the block or the top surface 49 of the tee nut 241 when the bolt is fully tightened. However, this is not necessary or even preferred since the limiting element should be the cinch on the cable. Therefore, some gap between the lower surface 51 of the bolt head 30 and the upper surface 48 of the block as shown in FIG. 14 (or between the lower surface of the bolt head and the top surface 49 of the tee nut 241) is desirable to allow for additional tightening if required. When the bolt 20 is sufficiently tightened to cinch the plurality of arms formed by the relief cut(s), on the cable 18, the force exerted normal to the cable is very high and, with the coefficient of friction, creates a very effective locking action to prevent movement of the cable lid lock and secure the feeder lid against the reservoir body while the feeder is in use.

Figure 14A:
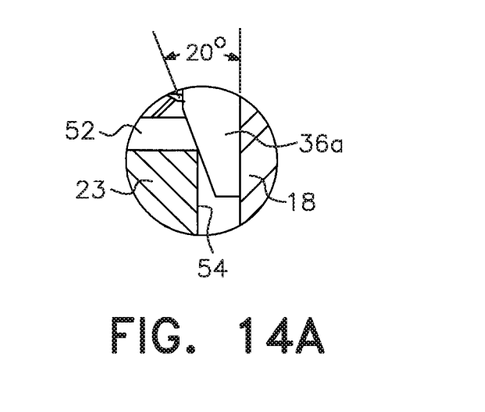
FIG. 14A is an enlarged view of Detail A of FIG. 14.

More particularly, the force applied normal to the cable by the cable lid lock as disclosed herein is on the order of 21 times greater than the force exerted by the spring-biased sure lock cable clamp discussed previously herein as forming part of the prior art. For example, it has been calculated that the force that the sure lock can apply to the cable is only on the order of about 7 lbs. By contrast, with the tapered bolt tip and two-stage stepped bore base block configuration as shown in FIGS. 14 and 14A, and based on a normal force ($F_N$) being applied against the bolt at a representative angle of about 20° and tightening to 4.2 lb-in with a coefficient of friction applicable to a plastic bolt and a steel wire rope coated with PVC or nylon, the cable lid lock can apply over 140 lbs of force. Alternatively, the wire could be left uncoated but if the parts are made of similar material, including the cable, there will be a correlating increase in the force required to overcome the locking mechanism due to the fact that the coefficient of friction will be similar for the different types of plastic used and the coating (or lack of coating) on the wire or cable. Because the force is $F=u*F_N$, any increase in $F_N$ will result in an increase of F, assuming that u (coefficient of friction) is similar or the same.

To fill the reservoir body of the feeder, the user grasps the bolt 20, either along the knurled edge 38 or using the decorative bird, when included, for additional torque, and loosens the bolt within the base block 23 by turning the bolt counter-clockwise or clockwise, for right or left handed threads, respectively, until the sides 36a, 36b of the tapered tip have been withdrawn from the middle part 54 of the bore 26. Once the tapered tip sides are no longer pressed together by the bore of the middle part 54, the sides 36a, 36b, although still within the bore 64 in the insert element 24, are free to move sufficiently outward to their pre-compressed spacing, releasing the holding force on the cable 18. The bolt 20 is then free to slide upwardly on the cable away from the base. The lid 16 of the feeder may then also be moved upwardly away from the reservoir body 14 to whatever level is necessary to enable the user to pour feed into the reservoir body 14. As is evident, neither the lid nor the cable lid lock need to be completely separated from the cable when filling the feeder, but only sufficiently displaced to enable the top of the reservoir body to be opened.

For use thereafter, the lid is placed back down to cover the opening in the top of the reservoir body and the bolt 20 of the cable lid lock 12 is slid down the cable close to the base as shown in FIGS. 13A. The bolt 20 is then inserted into the bore and rotated clockwise or counter-clockwise for right or left handed threads, respectively, to thread the shank back through the bore 64 of the insert element 24 until the tapered tip 36 of the bolt once again engages with the inner surface of the bore middle part 54, forcing the sides 36a, 36b toward one another to once again pinch the cable 18 and fix the cable lid lock in place to secure the lid in the closed position.

Figure 15:
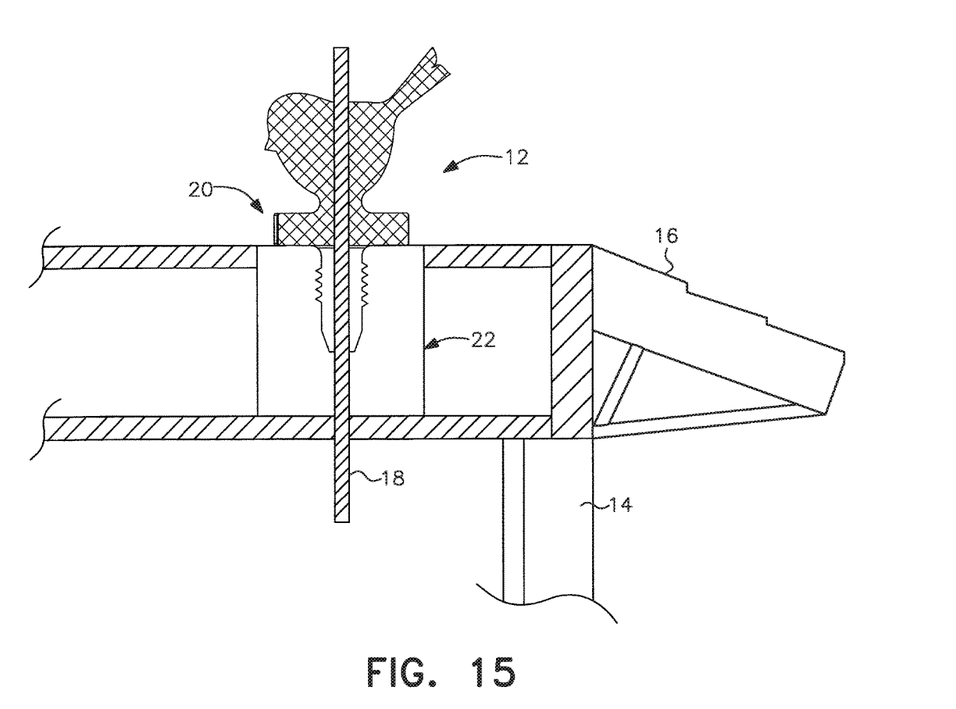
FIG. 15 is a further embodiment of the present invention in which the base block is inset within the feeder lid.

The bird feeder of the present invention may also be embodied with a lid that itself serves as the base block or with a lid having a base block inset within or positioned under the lid as representatively shown in FIG. 15.

As described herein, the cable lid lock of the present invention provides a secure means of preventing the lid of the bird feeder from being removed by a squirrel or other varmint. At the same time, by loosening the bolt within the base element, the cable lid lock may be slid back and forth along the cable to allow the lid to be easily removed by the user for refilling the feeder and then replaced and secured for use.

The foregoing descriptions and drawings should be considered as illustrative only of the principles of the invention. The invention may be configured in a variety of shapes and sizes and is not limited to the exact construction shown by the specific embodiments disclosed herein. Rather, all suitable modifications and equivalents may be resorted to, falling within the scope of the invention.

What is claimed is:

1. A bird feeder having a cable lid lock comprising:
   a reservoir body for holding seed, the reservoir body having an open top through which the feeder is filled;
   a removable lid configured to expose the open top for filling and to close the open top in use;
   a hanging cable secured to the reservoir body for suspending the feeder in use, the cable passing through an aperture in the lid;
   a cable lid lock including a base element and a threaded bolt, the base element being associated with the lid and having a lower surface and an upper surface distal from said lower surface, and having a bore of diminishing diameter from said upper surface to said lower surface, the threaded bolt being received within said bore, said bolt having an axial hole through which the hanging cable is fed and a shank with a relief cut therein that forms a plurality of arms on at least two sides of the cable, the plurality of arms being pressed toward one another as the bolt is tightened into the diminishing diameter base element bore, squeezing the cable where it extends through the axial hole in the bolt and exerting a force normal to the cable that, with a coefficient of friction as between the cable and the bolt, fixes the cable lid lock on the cable to secure the lid against the feed reservoir body when the bolt has been tightened.

2. The bird feeder as set forth in claim 1, wherein the bore of diminishing diameter is tapered.

3. The bird feeder as set forth in claim 1, wherein the bore of diminishing diameter is stepped.

4. The bird feeder as set forth in claim 3, wherein the bolt has a tapered tip.

5. The bird feeder as set forth in claim 4, wherein the bore has a threaded upper part having a first diameter, a middle part having a second diameter smaller than the first diameter, and a lower part having a third diameter smaller than the second diameter, the first diameter being large enough to receive the bolt in threaded engagement, the tapered tip of said bolt coming into engagement with the bore middle part as the bolt is tightened to press the two sides toward one another and exert the normal force on the cable and fix the cable lid lock thereon.

6. The bird feeder as set forth in claim 1, wherein the top surface of the removable lid has a pitched roof line, said base element being positioned on top of the lid with said base lower surface having an inverted V-shape to fit onto said pitched roof line.

7. The bird feeder as set forth in claim 1, wherein the base element is fixed to the lid.

8. The bird feeder as set forth in claim 1, wherein the base element is separate from the lid and fixed thereto when the bolt of the cable lid lock is tightened.

9. The bird feeder as set forth in claim 1, wherein the bolt is molded to include a decorative top portion.

10. The bird feeder as set forth in claim 1, wherein the base element includes a base block having said bore therein and an internally threaded insert fitted within the bore for engagement with the threaded bolt.

11. The bird feeder as set forth in claim 10, wherein the insert is a tee nut.

12. The bird feeder as set forth in claim 10, wherein the insert is a fastener having external engaging elements and a drive mechanism for screwing the fastener into the bore.

13. A method of releasably securing a removable lid on a bird feeder, the method comprising the steps of:
 providing a bird feeder with a reservoir body for holding seed and an open top through which the reservoir body is filled, a removable lid configured to expose the open top for filling and to close the open top in use, and a hanging cable secured to the reservoir body for suspending the feeder in use, the cable passing through an aperture in the lid;
 passing the cable through a cable lid lock that includes a base element and a threaded bolt, the base element being associated with the lid and having a lower surface and an upper surface distal from said lower surface, and having a bore of diminishing diameter from said upper surface to said lower surface, the threaded bolt being received within said bore, said bolt having an axial hole through which the hanging cable is fed and a shank with a relief cut therein that forms at least two arms on different sides of the cable;
 tightening the bolt into the diminishing diameter base element bore to press the at least two arms toward one another and squeeze the cable where it extends through the axial hole in the bolt to exert a normal force that, with a coefficient of friction as between the cable and the bolt, locks the cable lid lock on the cable, the cable lid lock acting to secure the lid against the feed reservoir body.

14. The method as set forth in claim 13, further comprising the steps of:
 loosening the bolt by at least partially extracting said bolt from said diminishing diameter base element bore to allow the at least two arms to move outwardly to release squeezing pressure on the cable; and
 sliding the bolt on the cable to allow the lid to be displaced from the reservoir body to expose the open top for filling of the bird feeder.

15. The method as set forth in claim 14, further comprising the steps of:
 moving the lid back into abutment with the reservoir body to close the open top;
 sliding the bolt on the cable to engage with the base element; and
 tightening the bolt into the diminishing diameter base element bore to lock the cable lid lock on the cable and secure the lid against the reservoir body.

16. The method as set forth in claim 13, further comprising the steps of:
 loosening the bolt by at least partially extracting said bolt from said diminishing diameter base element bore to allow the at least two arms to move outwardly to release squeezing pressure on the cable; and
 sliding the lid and base element of the cable lid lock on the cable to displace the lid from the reservoir body and expose the open top for filling of the bird feeder, the lid and base element remaining fixed to one another at all times.

17. The method as set forth in claim 16, further comprising the steps of:
 moving the lid back into abutment with the reservoir body to close the open top; and
 tightening the bolt into the diminishing diameter base element bore to lock the cable lid lock on the cable and secure the lid against the reservoir body.

\* \* \* \* \*